US011745582B2

(12) United States Patent
Lee et al.

(10) Patent No.: US 11,745,582 B2
(45) Date of Patent: Sep. 5, 2023

(54) CAPLESS FILLER NECK STRUCTURE

(71) Applicants: Hyundai Motor Company, Seoul (KR); Kia Motors Corporation, Seoul (KR); Korea Fuel-Tech Corporation, Anseong-si (KR)

(72) Inventors: Tae Yoon Lee, Seoul (KR); June Young Park, Hwaseong-si (KR); Seung Hoon Choi, Seoul (KR); Jun Sik Lim, Bucheon-si (KR); Sung Won Lee, Hwaseong-si (KR); Dong Chui Lee, Hwaseong-si (KR); Ki Hong Kim, Anseong-si (KR)

(73) Assignees: Hyundai Motor Company, Seoul (KR); Kia Motors Corporation, Seoul (KR); Korea Fuel-Tech Corporation, Anseong-si (KR)

( * ) Notice: Subject to any disclaimer, the term of this patent is extended or adjusted under 35 U.S.C. 154(b) by 190 days.

(21) Appl. No.: 17/020,119

(22) Filed: Sep. 14, 2020

(65) Prior Publication Data

US 2021/0170862 A1 Jun. 10, 2021

(30) Foreign Application Priority Data

Dec. 10, 2019 (KR) .......................... 10-2019-0163618

(51) Int. Cl.
*B60K 15/05* (2006.01)
*B67D 7/36* (2010.01)
*B60K 15/04* (2006.01)

(52) U.S. Cl.
CPC ................. *B60K 15/05* (2013.01); *B67D 7/36* (2013.01); *B60K 2015/0461* (2013.01); *B60K 2015/0474* (2013.01)

(58) Field of Classification Search
CPC ............ B60K 15/05; B60K 2015/0461; B60K 2015/0474; B67D 7/36
See application file for complete search history.

(56) References Cited

U.S. PATENT DOCUMENTS 6,968,874 B1 11/2005 Gabbey et al.
10,000,117 B2 6/2018 Giles et al.
(Continued)

FOREIGN PATENT DOCUMENTS

JP 2008515717 A 5/2008
JP 2018505093 A 2/2018
(Continued)

*Primary Examiner* — Jason K Niesz
(74) *Attorney, Agent, or Firm* — Slater Matsil, LLP (57) ABSTRACT

A capless filler neck structure including a filler tube configured to be fixed into a vehicle and define a transfer passage for fuel to be transferred to a fuel tank of the vehicle, a first retainer fitted into the filler tube, a first flapper positioned adjacent to the first retainer to be sealed from the outside, a second retainer positioned adjacent to the first retainer and fitted into the filler tube, a cover fitted to the second retainer to define an opening configured to receive a fuel gun, a second flapper positioned adjacent to the second retainer to be sealed from the outside, and an anti-error-injection member fitted to the second retainer and configured to be unlatched when the fuel gun having a predetermined diameter or more is inserted.

17 Claims, 5 Drawing Sheets

(56) References Cited

U.S. PATENT DOCUMENTS

| | | | |
|---|---|---|---|
| 2006/0032549 A1* | 2/2006 | McClung | B60K 15/04 |
| | | | 141/97 |
| 2014/0284329 A1* | 9/2014 | Frank | B60K 15/03006 |
| | | | 220/86.2 |
| 2015/0158379 A1 | 6/2015 | Stancu et al. | |
| 2016/0221435 A1 | 8/2016 | Kerin, Jr. et al. | |
| 2017/0274761 A1* | 9/2017 | Kapaun | B60K 15/04 |
| 2018/0079296 A1* | 3/2018 | Wakao | B60K 15/04 |
| 2020/0376956 A1* | 12/2020 | Dufendach | B60K 15/05 |

FOREIGN PATENT DOCUMENTS

| | | |
|---|---|---|
| KR | 20120008592 A | 2/2012 |
| KR | 20120103198 A | 9/2012 |
| KR | 20160105417 A | 9/2016 |

\* cited by examiner

DOWNWARD MOVEMENT OF LOWER FLAP

[ ENLARGEMENT OF PORTION "A" ]

FIG. 6B

[ "B-B" SECTION ]

CAPLESS FILLER NECK STRUCTURE

CROSS-REFERENCE TO RELATED APPLICATIONS

This application claims the benefit of Korean Patent Application No. 10-2019-0163618, filed on Dec. 10, 2019, which application is hereby incorporated herein by reference.

TECHNICAL FIELD

The present disclosure relates to a capless filler neck structure.

BACKGROUND

In general, a vehicle includes a fuel tank that stores fuel required for engine combustion and a fuel filler neck for refueling provided at the end of a fuel supply pipe connected to the fuel tank.

The top end or inlet end of the fuel supply pipe is typically formed to receive a fuel cap that is removed only during refueling. However, not only is there a risk of losing the fuel cap, but there is also a disadvantage in that a user needs to additionally remove and lock the fuel cap for self-refueling in a self-service gas station.

Accordingly, there is a need for a capless fuel system that does not require the fuel cap to close the fuel supply pipe.

Meanwhile, a fuel gun for injecting fuel into the fuel filler neck varies in diameter and refueling speed depending on gasoline or diesel fuel.

Usually, a diesel fuel gun for injection of diesel fuel is a diameter larger than a gasoline fuel gun for injection of gasoline fuel, so that a fuel filler neck of a diesel vehicle has a diameter larger than that of a gasoline vehicle.

For example, the diesel fuel gun has a diameter of about 25 to 31 mm, the gasoline fuel gun has a diameter of about 19 to 21 mm in diameter, the fuel filler neck of the gasoline vehicle has a diameter of about 22 mm, and the fuel filler neck of the diesel vehicle has a diameter of about 26 to 32 mm.

Accordingly, erroneous injection of fuel may not occur in the gasoline vehicle since only the gasoline fuel gun can be inserted into the gasoline vehicle and the diesel fuel gun cannot be inserted thereinto. However, erroneous injection of fuel may frequently occur in the diesel vehicle since the gasoline fuel gun as well as the diesel fuel gun can be inserted into the diesel vehicle. Such erroneous injection of fuel may not only lower the output of the engine and damage the engine itself, but may also cause the engine to stop during operation, which may lead to a large accident and damage to fuel system equipment such as injection pumps.

Incidentally, even if an anti-error-injection structure is applied to an existing capless structure, a sealing structure is not applied thereto that can prevent inflow of foreign substances into the fuel tank or outflow of evaporation gas generated in the fuel tank to the outside. Therefore, it is necessary to develop a capless filler neck structure with a sealing function in addition to the existing anti-error-injection structure.

The above information disclosed in this Background section is only for enhancement of understanding of the background of the disclosure and therefore it may contain information that does not form the prior art that is already known to a person of ordinary skill in the art.

SUMMARY

Embodiments of the present disclosure solve problems associated with prior art.

The present disclosure relates to a capless filler neck structure. Particular embodiments relate to a capless filler neck structure capable of performing a sealing function while preventing erroneous injection of fuel even with no fuel cap.

In one aspect, an embodiment of the present disclosure provides a capless filler neck structure that includes an anti-error-injection member composed of flaps moving in three directions.

In another aspect, an embodiment of the present disclosure provides a capless filler neck structure having a double sealed flapper.

The present disclosure is not limited to the above-mentioned aspects and other aspects and advantages of the present disclosure can be understood by the following description and become apparent with reference to the embodiments of the present disclosure. Also, it is obvious to those skilled in the art to which the present disclosure pertains that the aspects and advantages of the present disclosure can be realized by the means as claimed and combinations thereof.

The above and other aspects can be accomplished by the provision of a capless filler neck structure.

There is provided a capless filler neck structure that includes a filler tube fixed into a vehicle and defining a transfer passage for allowing fuel to be transferred to a fuel tank of the vehicle, a first retainer fitted into the filler tube, a first flapper positioned adjacent to the first retainer to be sealed from the outside, a second retainer positioned adjacent to the first retainer and fitted into the filler tube, a cover fitted to the second retainer to define an opening for insertion of a fuel gun, a second flapper positioned adjacent to the second retainer to be sealed from the outside, and an anti-error-injection member fitted to the second retainer and unlatched in case of insertion of a fuel gun having a predetermined diameter or more.

The first flapper may include a first seal forming its outer peripheral surface, and a first hinge spring hinged thereto such that the first flapper is opened upward when the fuel gun is inserted thereinto.

The second flapper may include a second seal forming its outer peripheral surface, and a second hinge spring hinged thereto such that the second flapper is opened upward when the fuel gun is inserted thereinto.

The anti-error-injection member may include first and second flaps spaced apart from each other while facing each other in a width direction of the anti-error-injection member, the first and second flaps being moved in a direction away from each other in case of the insertion of the fuel gun having the predetermined diameter or more, and a third flap positioned in a lower space between the first flap and the second flap to be locked to the first and second flaps, the third flap being unlocked in case of the insertion of the fuel gun having the predetermined diameter or more, so as to be movable outward of the outer peripheral surface of the fuel gun.

The anti-error-injection member may include a spring formed at one end of each of the first to third flaps, the spring being elastically supported by the second retainer.

The first flap may have a first latching protrusion formed to be locked to one end of the third flap. The second flap may have a second latching protrusion formed to be locked to the other end of the third flap. The third flap may have a first latching groove formed at one end thereof to have a shape corresponding to the first latching protrusion, and a second latching groove formed at the other end thereof to have a shape corresponding to the second latching protrusion.

In case of the insertion of the fuel gun having the predetermined diameter or more, a distance between the first flap and the second flap may increase and the first and second latching protrusions may be unlatched from the first and second latching grooves, so that the third flap is movable downward.

The third flap may have a third latching protrusion formed to be locked to the second flapper, and the second flapper may have a flapper latching groove formed to have a shape corresponding to the third latching protrusion.

When the third flap is moved downward, the third latching protrusion may be unlatched from the flapper latching groove so that the second flapper is opened upward by tension of the fuel gun applied thereto.

In case of the insertion of the fuel gun having the predetermined diameter or more, the first flapper may be opened upward about a first hinge spring by tension applied to the first flapper being closed and the second flapper may be opened upward about a second hinge spring by tension applied to the second flapper being closed.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent parts of embodiments of the present disclosure throughout the several figures of the drawing.

DETAILED DESCRIPTION OF ILLUSTRATIVE EMBODIMENTS

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

In addition, the term "part" or the like described herein refers to a unit for processing at least one function or operation, which may be implemented by hardware or software, or in combination thereof.

In addition, the terms first, second, and so on used herein are to distinguish the names of the components from each other in the same relation, and are not necessarily limited to those in the following description.

In addition, the term "downward" used herein refers to a downward direction based on the side on which a fuel gun is inserted.

Figure 1:
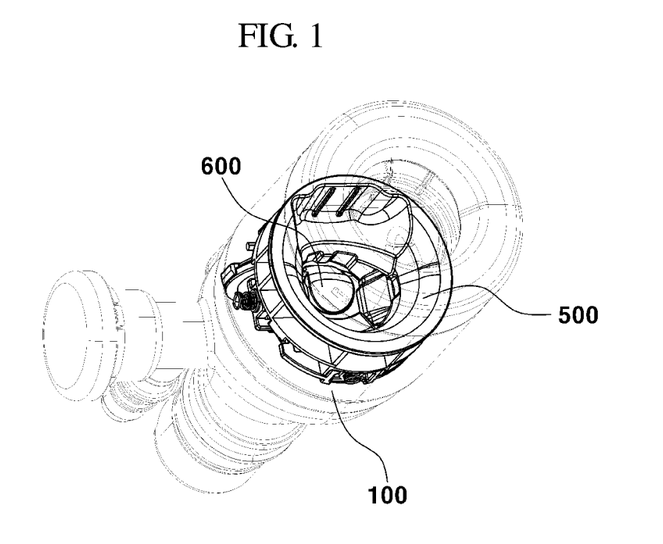
FIG. 1 is a perspective view illustrating a capless filler neck structure according to an embodiment of the present disclosure.
Figure 2:
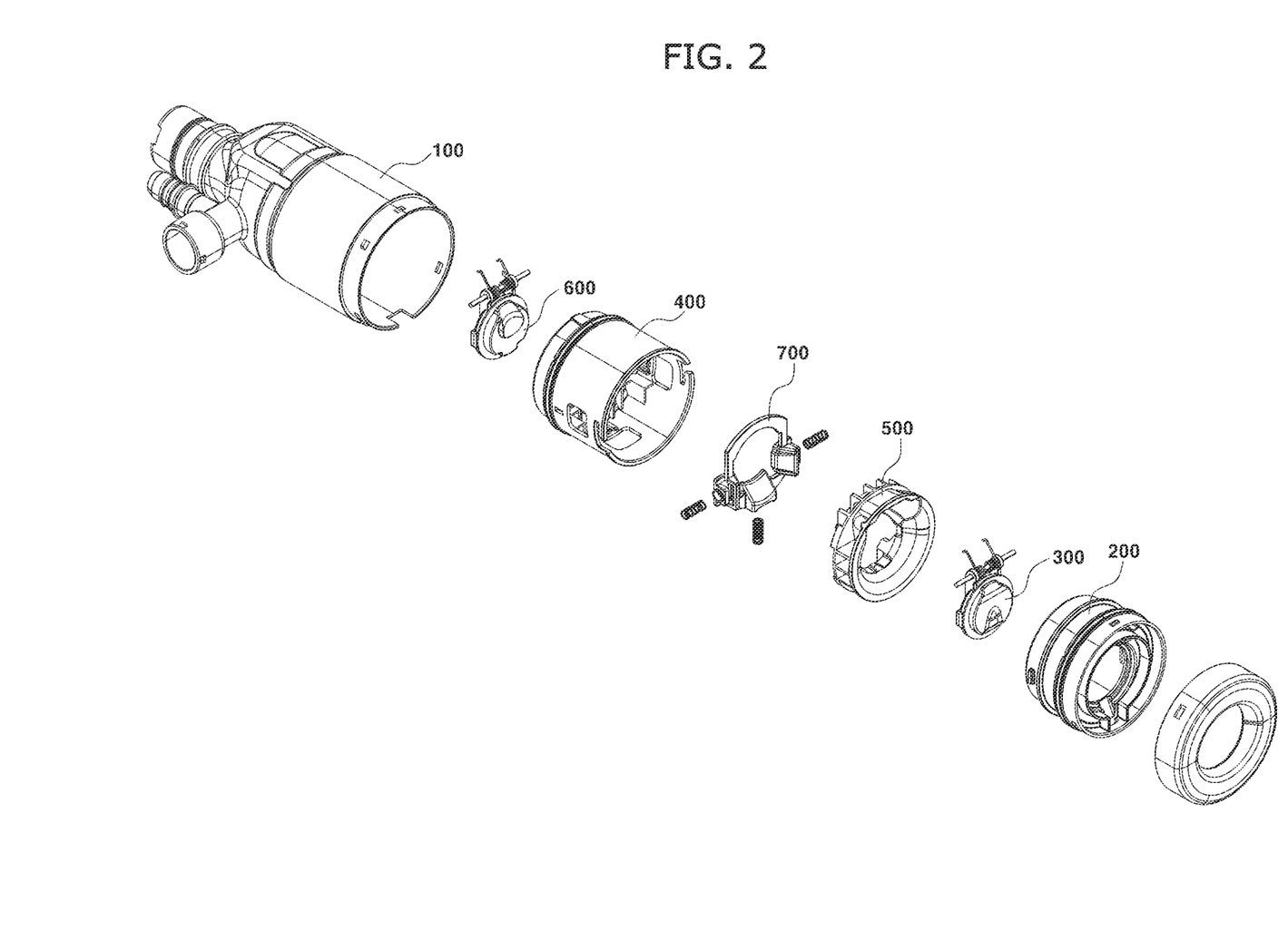
FIG. 2 is a view illustrating a configuration of the capless filler neck structure according to an embodiment of the present disclosure.

FIG. 1 is a perspective view illustrating a capless filler neck structure according to an embodiment of the present disclosure. FIG. 2 is a view illustrating a configuration of the capless filler neck structure according to an embodiment of the present disclosure.

Referring to FIGS. 1 and 2, the capless filler neck structure according to embodiments of the present disclosure includes a filler tube 100 fixed into a vehicle and defining a transfer passage for allowing fuel to be transferred to a fuel tank of the vehicle, a first retainer 200 fitted into the filler tube 100, a first flapper 300 positioned adjacent to the first retainer 200 to be sealed from the outside, a second retainer 400 positioned adjacent to the first retainer 200 and fitted into the filler tube 100, a cover 500 fitted to the second retainer 400 to define an opening for insertion of a fuel gun, a second flapper 600 positioned adjacent to the second retainer 400 to be sealed from the outside, and an anti-error-injection member 700 fitted to the second retainer 400 and unlatched in case of insertion of a fuel gun having a predetermined diameter or more.

The filler tube 100 may be fixed into the vehicle and define the transfer passage for allowing fuel to be transferred to the fuel tank of the vehicle. The fuel gun may be inserted and fixed into the filler tube 100 from the outside, and the filler tube 100 may define an inflow path of fuel from the fuel gun.

One end of the filler tube 100 may be connected to the fuel tank of the vehicle through a pipe. The other end of the filler tube 100 may be exposed out of a fuel inlet of a vehicle body. The fuel introduced into the filler tube 100 may be guided to the fuel tank through the pipe.

The first retainer 200 may be fitted into the filler tube 100. The first retainer 200 may be fitted close to the other end of the filler tube 100. The first retainer 200 may be a fuel injection passage. In addition, the first retainer 200 may allow the evaporation gas in the fuel tank to be discharged to the outside when the fuel gun is injected to refuel.

The first flapper 300 may be positioned adjacent to the first retainer 200 to be sealed from the outside. The first flapper 300 may be positioned close to the other end of the filler tube 100, and one end of the first flapper 300 may be fixed to the first retainer 200. The first flapper 300 may be opened by rotating the other end thereof about one end thereof fixed to the first retainer 200.

The second retainer 400 may be positioned adjacent to the first retainer 200 and fitted into the filler tube 100. The second retainer 400 may be fitted close to one end of the filler tube 100. The second retainer 400 may be a fuel injection passage together with the first retainer 200. In addition, the second retainer 400 may allow the evaporation gas in the fuel tank to be discharged to the outside when the fuel gun is injected to refuel.

The cover 500 may be fitted to the second retainer 400 to define an opening for insertion of the fuel gun. The cover 500 may guide the fuel gun to the center position of the filler tube 100 after the first flapper 300 is opened by the insertion of the fuel gun. The fuel gun may be inserted through the front of the cover 500, and the anti-error-injection member 700 and the second flapper 600 may be sequentially formed on the back of the cover 500.

The second flapper 600 may be positioned adjacent to the second retainer 400 to be sealed from the outside. The second flapper 600 may be positioned close to one end of the filler tube 100, and a first end of the second flapper 600 may be fixed to the second retainer 400. The second flapper 600 may be opened by rotating a second end thereof about the first end thereof fixed to the second retainer 400. The second flapper 600 may be spaced apart from the first flapper 300 to perform a double sealing function.

The anti-error-injection member 700 may be fitted to the second retainer 400 and unlatched in case of insertion of a fuel gun having a predetermined diameter or more. The anti-error-injection member 700 may be positioned close to one end of the filler tube 100 to be positioned between the second flapper 600 and the cover 500. The anti-error-injection member 700 may be easily fixed into the second retainer 400 through a spring 740.

The anti-error-injection member 700 may not be unlatched in case of insertion of a fuel gun having a predetermined diameter or more, for example, in case of insertion of a gasoline fuel gun, whereas it may be unlatched in case of insertion of a diesel fuel gun.

Figure 3:
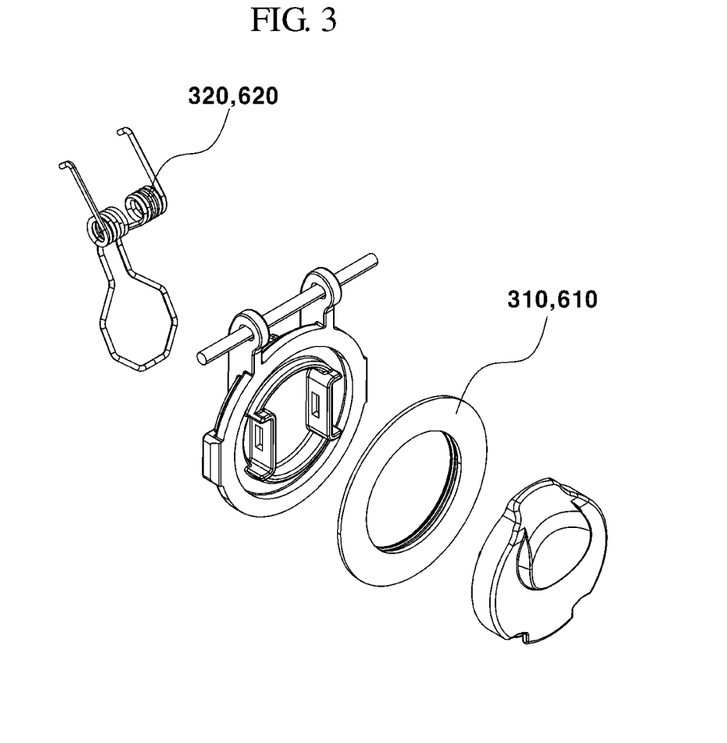
FIG. 3 is a view illustrating a configuration of first and second flapper s of the capless filler neck structure according to an embodiment of the present disclosure.

FIG. 3 is a view illustrating the configuration of the first and second flappers 300 and 600 of the capless filler neck structure according to an embodiment of the present disclosure.

Referring to FIG. 3, the first flapper 300 may include a first seal 310 forming the outer peripheral surface thereof and a first hinge spring 320 hinged thereto such that the first flapper 300 is opened upward when the fuel gun is inserted thereinto. In addition, the second flapper 600 may include a second seal 610 forming the outer peripheral surface thereof and a second hinge spring 620 hinged thereto such that the second flapper 600 is opened upward when the fuel gun is inserted thereinto.

The conventional filler neck with the fuel cap is configured such that, when the fuel gun presses the left and right flaps during insertion, the flapper connected to the flaps is moved integrally therewith to be opened by applying the tension of the fuel gun to the flapper in order to prevent erroneous injection of fuel. In this case, the fuel cap serves a protective function to prevent the inflow of foreign substances, and the flapper serves as a passage for injection of fuel.

The capless filler neck structure according to an embodiment of the present disclosure can prevent the inflow of foreign substances from the outside through the double seal and prevent the outflow of the evaporation gas generated in the fuel tank to the outside. For user convenience, the first and second flappers 300 and 600, which are internal components of a filler neck, may serve as a seal, instead of the conventional fuel cap.

The first flapper 300 may have the first seal 310 forming the outer peripheral surface thereof. The first seal 310 may form a contact surface to which the fuel gun applies tension during insertion. Furthermore, the first flapper 300 may include the first hinge spring 320 hinged thereto such that the first flapper 300 is opened upward when the fuel gun is inserted thereinto. The first flapper 300 may be opened by rotating about the first hinge spring 320. When the fuel gun is separated from the first flapper 300, the first flapper 300 may be returned to its original closed position by the elastic force of the first hinge spring 320.

The second flapper 600 may have the second seal 610 forming the outer peripheral surface thereof. The second seal 610 may form a contact surface to which the fuel gun applies tension during insertion. Furthermore, the second flapper 600 may include the second hinge spring 620 hinged thereto such that the second flapper 600 is opened upward when the fuel gun is inserted thereinto. The second flapper 600 may be opened by rotating about the second hinge spring 620. When the fuel gun is separated from the second flapper 600, the second flapper 600 may be returned to its original closed position by the elastic force of the second hinge spring 620.

The first and second flappers 300 and 600 may be spaced apart from each other in the filler tube 100 to perform a double sealing function.

Figure 4:
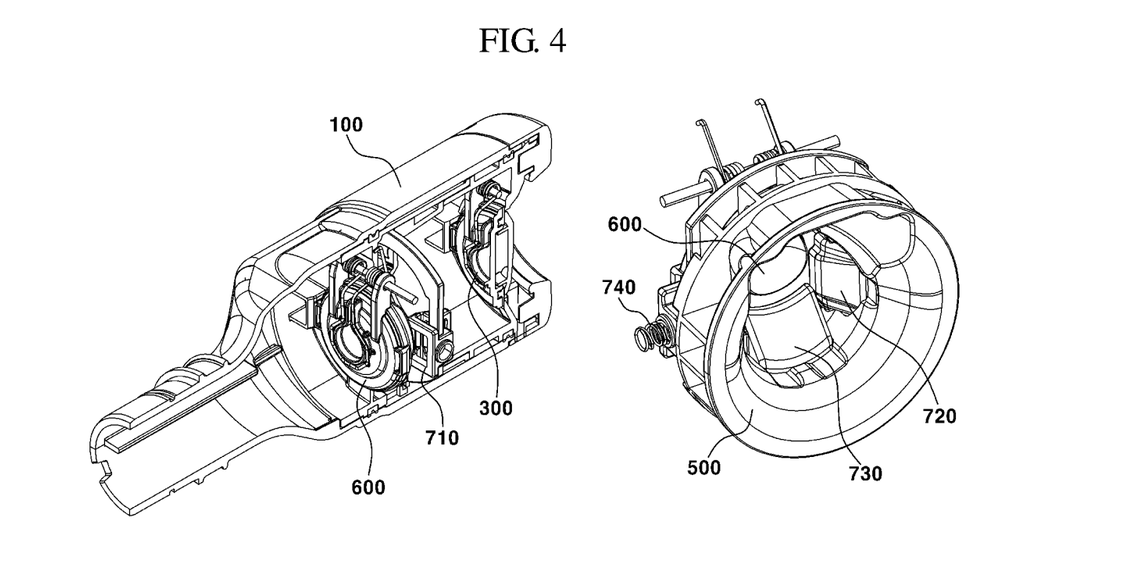
FIG. 4 is a view illustrating that the first and second flapper s are closed in the capless filler neck structure according to an embodiment of the present disclosure.

FIG. 4 is a view illustrating that the first and second flappers 300 and 600 are closed in the capless filler neck structure according to an embodiment of the present disclosure.

Referring to FIG. 4, the capless filler neck structure according to an embodiment of the present disclosure may be configured such that, in case of insertion of a fuel gun having a predetermined diameter or more, the first flapper 300 is opened upward about the first hinge spring 320 by the tension applied to the closed first flapper 300 and the second flapper 600 is opened upward about the second hinge spring 620 by the tension applied to the closed second flapper 600.

The capless filler neck structure may be configured such that, in case of insertion of a fuel gun having a diameter less than a predetermined diameter, the first flapper 300 is opened upward by the tension applied to the closed first flapper 300 whereas the second flapper 600 is not opened. Since the second flapper 600 is not opened by the anti-error-injection member 700 even though the tension of the fuel gun is applied to the second flapper 600, it is possible to prevent an accident in which fuel is entrained in the vehicle.

In case of the insertion of the fuel gun having the predetermined diameter or more, the first flapper 300 may be opened upward about the first hinge spring 320. When the fuel gun continues to apply tension to the closed second flapper 600 with the first flapper 300 opened, the second flapper 600 may be opened upward about the second hinge spring 620.

During the insertion of the fuel gun, the first hinge spring 320 may maintain the elastic force thereof so that the first flapper 300 is kept open. Likewise, during the insertion of the fuel gun, the second hinge spring 620 may maintain the elastic force thereof so that the second flapper 600 is kept open.

In case of the separation of the fuel gun having the predetermined diameter or more, the second flapper 600 may be returned to its original closed state by the elastic restoring force of the second hinge spring 620. Subsequently, the first flapper 300 may be returned to its original closed state by the elastic restoring force of the first hinge spring 320.

Figure 5:
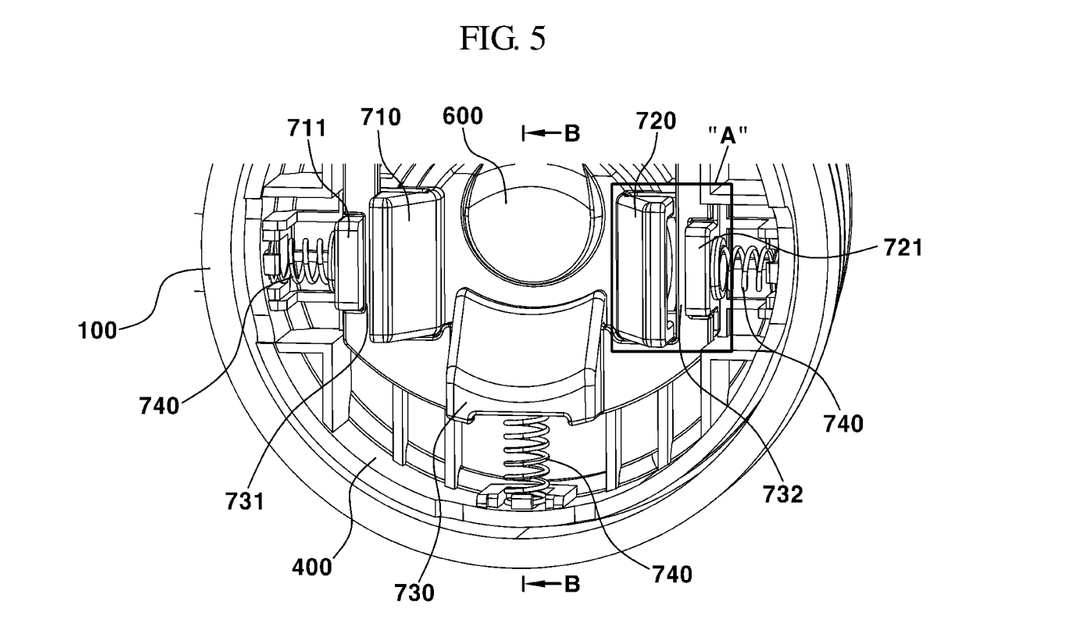
FIG. 5 is a view illustrating an anti-error-injection member of the capless filler neck structure according to an embodiment of the present disclosure.
Figure 6A:
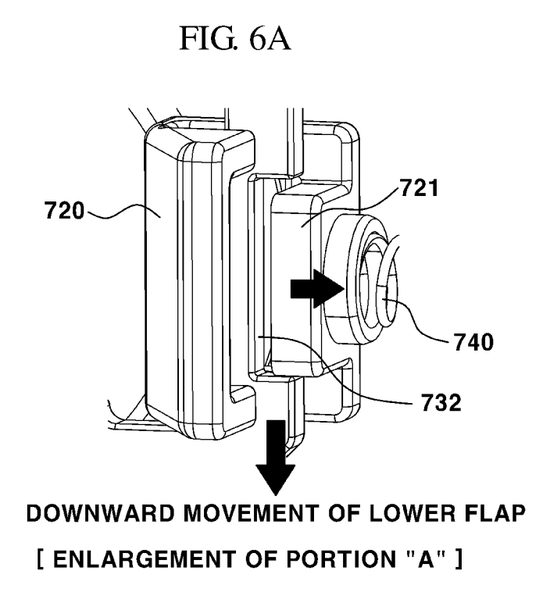
FIG. 6A is an enlarged view illustrating a second flap of the capless filler neck structure according to an embodiment of the present disclosure.

FIG. 5 is a view illustrating the anti-error-injection member 700 of the capless filler neck structure according to an embodiment of the present disclosure. FIG. 6A is an enlarged view of portion "A" of FIG. 5 illustrating a second flap of the capless filler neck structure according to an embodiment of the present disclosure.

Referring to FIG. 5, the anti-error-injection member 700 according to an embodiment of the present disclosure may include a first flap 710 and a second flap 720 that are spaced apart from each other while facing each other in the width direction of the anti-error-injection member 700 and that are moved in a direction away from each other in case of the insertion of the fuel gun having the predetermined diameter or more. In addition, the anti-error-injection member 700 may include a third flap 730 that is positioned in a lower space between the first flap 710 and the second flap 720 to be locked to the first and second flaps 710 and 720 and that is unlocked in case of the insertion of the fuel gun having the predetermined diameter or more, so as to be movable outward of the outer peripheral surface of the fuel gun.

In addition, the anti-error-injection member 700 may include a spring 740 formed at one end of each of the first to third flaps 710 to 730 and elastically supported by the second retainer 400.

The first and second flaps 710 and 720 may be spaced apart from each other in the width direction of the anti-error-injection member 700. The spring 740 may be fixedly installed to one end of each of the first and second flaps 710 and 720 and elastically supported by the second retainer 400.

In case of the insertion of the fuel gun having the predetermined diameter or more, the first and second flaps 710 and 720 may be moved in a direction away from each other. In case of insertion of a fuel gun larger than the distance between the other end of the first flap 710 and the other end of the second flap 720, the first and second flaps 710 and 720 may be moved outward of the outer peripheral surface of the fuel gun by the tension of the fuel gun applied thereto.

The third flap 730 may be positioned in the lower space between the first flap 710 and the second flap 720. When the first and second flaps 710 and 720 do not move, the third flap 730 may be kept locked to the first and second flaps 710 and 720.

The spring 740 may be fixedly installed to one end of the third flap 730 and elastically supported by the second retainer 400. When the tension of the fuel gun is applied to the other end of the third flap 730, the spring 740 at one end of the third flap 730 may be compressed so that the third flap 730 is moved downward.

The existing anti-error-injection structure is configured such that the flapper is opened by moving along with the movement of the flaps in two directions. The second flapper 600 of an embodiment of the present disclosure may be coupled to the anti-error-injection member 700 to prevent erroneous injection of fuel and at the same time may be fixedly installed to the second retainer 400 to perform a sealing function.

To this end, the anti-error-injection member 700 may be moved in three directions. The first and second flaps 710 and 720 may not be connected to the second flapper 600. In case of the insertion of the fuel gun having the predetermined diameter or more, the first and second flaps 710 and 720 may be first moved in a direction away from each other. In this case, the second flapper 600 may be locked to the third flap 730 so as not to move. Subsequently, when the third flap 730 is moved downward, the second flapper 600 may be opened.

In the capless filler neck structure according to an embodiment of the present disclosure, the first flap 710 may have a first latching protrusion 711 formed to be locked to one end of the third flap 730, and the second flap 720 may have a second latching protrusion 721 formed to be locked to the other end of the third flap 730. Correspondingly, the third flap 730 may have a first latching groove 731 formed at one end thereof while having a shape corresponding to the first latching protrusion 711, and a second latching groove 732 formed at the other end thereof while having a shape corresponding to the second latching protrusion 721.

In case of the insertion of the fuel gun having the predetermined diameter or more, the distance between the first flap 710 and the second flap 720 may increase and the first and second latching protrusions 711 and 721 may be unlatched from the first and second latching grooves 731 and 732 so that the third flap 730 is movable downward.

Referring to FIG. 6A, the first latching protrusion 711 may have a shape corresponding to the first latching groove 731. Likewise, the second latching protrusion 721 may have a shape corresponding to the second latching groove 732. Thus, the third flap 730 may be locked to the first and second flaps 710 and 720.

In case of the insertion of the fuel gun having the predetermined diameter or more, the distance between the first flap 710 and the second flap 720 may increase. Thus, the first latching protrusion 711 may be separated from the first latching groove 731, and the second latching protrusion 721 may be separated from the second latching groove 732. Subsequently, when the fuel gun applies tension to the third flap 730, the third flap 730 may be moved downward.

Figure 6B:
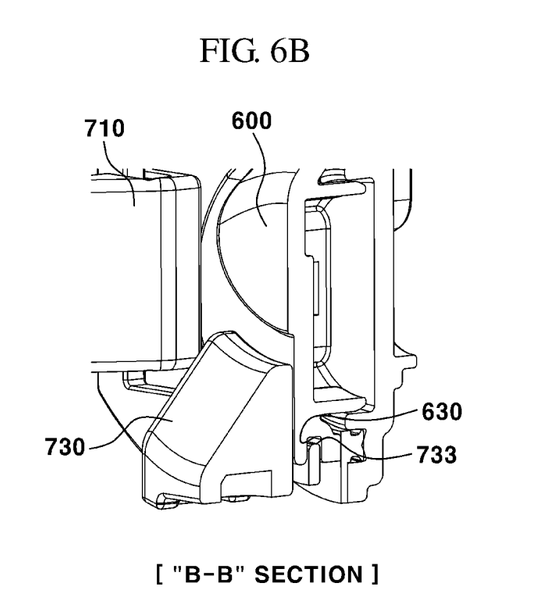
FIG. 6B is a cross-sectional view illustrating the anti-error-injection member of the capless filler neck structure according to an embodiment of the present disclosure.

FIG. 6B is a cross-sectional view along line B-B of FIG. 5 illustrating the anti-error-injection member 700 of the capless filler neck structure according to an embodiment of the present disclosure.

Referring to FIG. 6B, in the capless filler neck structure according to an embodiment of the present disclosure, the third flap 730 may have a third latching protrusion 733 formed to be locked to the second flapper 600, and the second flapper 600 may have a flapper latching groove 630 formed to have a shape corresponding to the third latching protrusion 733.

When the third flap 730 is moved downward, the third latching protrusion 733 may be unlatched from the flapper latching groove 630 so that the second flapper 600 is opened upward by the tension of the fuel gun applied thereto.

Since the third latching protrusion 733 has a shape corresponding to the flapper latching groove 630, the second flapper 600 may be kept locked even when the tension of the fuel gun is applied thereto. In case of the insertion of the fuel gun having the diameter less than the predetermined diameter, the second flapper 600 may not be opened upward because the third latching protrusion 733 is latched to the flapper latching groove 630, even though the tension is applied to the front of the second flapper 600.

In case of the insertion of the fuel gun having the predetermined diameter or more, the third latching protrusion 733 may be separated from the flapper latching groove 630 while the third flap 730 is moved downward. Thus, the second flapper 600 may be rotated and opened upward by the tension of the fuel gun applied thereto.

In summary, the capless filler neck structure of embodiments of the present disclosure includes the anti-error-injection member 700 composed of the first to third flaps 710 to 730 moving in three directions and has the double sealing structure in which the first and second flappers 300 and 600 are spaced apart from each other. Therefore, it is possible to prevent erroneous injection of fuel while performing the sealing function even with no fuel cap.

As is apparent from the above description, the present disclosure can obtain the following effects by the configuration, combination, and relationship of the components described in the exemplary embodiments.

The capless filler neck structure can prevent erroneous injection of fuel since it includes the anti-error-injection member composed of the flaps moving in three directions.

The capless filler neck structure can perform the sealing function even with no fuel cap since it includes the double sealed flapper.

The above detailed description is illustrative of the disclosure. In addition, the above description is intended to illustrate and explain the preferred embodiments of the present disclosure, and the present disclosure may be used in various other combinations, modifications, and environments. That is, it is possible to make changes or modifications within the scope of the concept of the disclosure disclosed herein, within the scope of the disclosure, and/or within the skill and knowledge of the art. The described embodiments are intended to illustrate the best mode for carrying out the technical idea of the present disclosure and various changes may be made in the specific applications and uses of the present disclosure. Accordingly, the detailed description of the disclosure is not intended to limit the disclosure to the disclosed embodiments. It is also to be understood that the appended claims are intended to cover such other embodiments.

What is claimed is:

1. A capless filler neck structure comprising:
a filler tube configured to be fixed into a vehicle and to define a transfer passage for fuel to be transferred to a fuel tank of the vehicle;
a first retainer fitted into the filler tube;
a first flapper positioned adjacent to the first retainer to be sealed from the outside, wherein, absent any external force, the first flapper maintains a closed position by a tension of a first hinge spring;
a second retainer positioned adjacent to the first retainer and fitted into the filler tube;
a cover fitted to the second retainer to define an opening configured to receive a fuel gun;
a second flapper positioned adjacent to the second retainer to be sealed from the outside, wherein, absent any external force, the second flapper maintains a closed position by a tension of a second hinge spring; and
an anti-error-injection member fitted to the second retainer and configured to be unlatched when the fuel gun having a predetermined diameter or more is inserted, wherein, when the fuel gun is inserted, the first flapper is configured to be opened by applying pressure to overcome the tension of the first hinge spring and the second flapper is configured to be opened by applying pressure to overcome the tension of the second hinge spring wherein the anti-error injection member comprises: first and second flaps spaced apart from each other while facing each other in a width direction of the anti-error injection member, the first and second flaps configured to move in a direction away from each other when the fuel gun having the predetermined diameter or more is inserted; a third flap positioned in a lower space between the first flap and the second flap and configured to be locked to the first flap and the second flap, the third flap configured to be unlocked when the fuel gun having the predetermined diameter or more is inserted, so as to be movable outward of an outer peripheral surface of the fuel gun; and a spring formed at one end of each of the first flap, the second flap, and the third flap, the spring being elastically supported by the second retainer.

2. The capless filler neck structure of claim 1, wherein the first flapper comprises a first seal forming its outer peripheral surface and wherein the first hinge spring is hinged to the first flapper such that the first flapper is configured to be opened when the fuel gun is inserted.

3. The capless filler neck structure of claim 1, wherein the second flapper comprises a second seal forming its outer peripheral surface and wherein the second hinge spring is hinged to the second flapper such that the second flapper is configured to be opened when the fuel gun is inserted.

4. The capless filler neck structure of claim 1, wherein:
the first flap has a first latching protrusion formed to be locked to a first end of the third flap;
the second flap has a second latching protrusion formed to be locked to a second end of the third flap; and
the third flap has a first latching groove formed at the first end thereof to have a shape corresponding to the first latching protrusion, and a second latching groove formed at the second end thereof to have a shape corresponding to the second latching protrusion.

5. The capless filler neck structure of claim 4, wherein, when the fuel gun having the predetermined diameter or more is inserted, a distance between the first flap and the second flap increases and the first and second latching protrusions are configured to be unlatched from the first and second latching grooves, so that the third flap is movable downward.

6. The capless filler neck structure of claim 1, wherein the third flap has a third latching protrusion formed to be locked to the second flapper, and the second flapper has a flapper latching groove formed to have a shape corresponding to the third latching protrusion.

7. The capless filler neck structure of claim 6, wherein when the third flap is moved downward, the third latching protrusion is configured to be unlatched from the flapper latching groove so that the second flapper is opened upward by tension of the fuel gun applied thereto.

8. A vehicle comprising:
a vehicle body;
a fuel tank within the vehicle body;
a filler tube fixed into the vehicle body and configured to define a transfer passage for fuel to be transferred to the fuel tank;
a first retainer fitted into the filler tube;
a first flapper positioned adjacent to the first retainer to be sealed from the outside, wherein, absent any external force, the first flapper maintains a closed position by a tension of a first hinge spring;
a second retainer positioned adjacent to the first retainer and fitted into the filler tube;
a cover fitted to the second retainer to define an opening configured to receive a fuel gun;
a second flapper positioned adjacent to the second retainer to be sealed from the outside, wherein, absent any external force, the second flapper maintains a closed position by a tension of a second hinge spring; and
an anti-error-injection member fitted to the second retainer and configured to be unlatched when the fuel gun having a predetermined diameter or more is inserted, wherein, when the fuel gun is inserted, the first flapper is configured to be opened by applying pressure to overcome the tension of the first hinge spring and the second flapper is configured to be opened by applying pressure to overcome the tension of the second hinge spring wherein the anti-error injection member comprises: first and second flaps spaced apart from each other while facing each other in a width direction of the anti-error injection member, the first and second flaps configured to move in a direction away from each other when the fuel gun having the predetermined diameter or more is inserted; a third flap positioned in a lower space between the first flap and the second flap and configured to be locked to the first flap and the second flap, the third flap configured to be unlocked when the fuel gun having the predetermined diameter or more is inserted, so as to be movable outward of an outer peripheral surface of the fuel gun; and a spring formed at one end of each of the first flap, the second flap, and the third flap, the spring being elastically supported by the second retainer.

9. The vehicle of claim 8, wherein the first flapper comprises a first seal forming its outer peripheral surface and wherein the first hinge spring is hinged to the first flapper such that the first flapper is configured to be opened when the fuel gun is inserted.

10. The vehicle of claim 9, wherein the second flapper comprises a second seal forming its outer peripheral surface and wherein the second hinge spring is hinged to the second flapper such that the second flapper is configured to be opened when the fuel gun is inserted.

11. The vehicle of claim 10, wherein:
the first flap has a first latching protrusion formed to be locked to a first end of the third flap;
the second flap has a second latching protrusion formed to be locked to a second end of the third flap; and
the third flap has a first latching groove formed at the first end thereof to have a shape corresponding to the first latching protrusion, and a second latching groove formed at the second end thereof to have a shape corresponding to the second latching protrusion.

12. The vehicle of claim 11, wherein, when the fuel gun having the predetermined diameter or more is inserted, a distance between the first flap and the second flap increases and the first and second latching protrusions are configured to be unlatched from the first and second latching grooves, so that the third flap is movable downward.

13. The vehicle of claim 11, wherein:
the third flap has a third latching protrusion formed to be locked to the second flapper;
the second flapper has a flapper latching groove formed to have a shape corresponding to the third latching protrusion; and
when the third flap is moved downward, the third latching protrusion is configured to be unlatched from the flapper latching groove so that the second flapper is opened upward by tension of the fuel gun applied thereto.

14. A capless filler neck structure comprising:
a filler tube configured to be fixed into a vehicle and to define a transfer passage for fuel to be transferred to a fuel tank of the vehicle;
a first retainer fitted into the filler tube;
a first flapper positioned adjacent to the first retainer to be sealed from the outside;
a second retainer positioned adjacent to the first retainer and fitted into the filler tube;
a cover fitted to the second retainer to define an opening configured to receive a fuel gun;
a second flapper positioned adjacent to the second retainer to be sealed from the outside; and
an anti-error-injection member fitted to the second retainer and configured to be unlatched when the fuel gun having a predetermined diameter or more is inserted, wherein the anti-error-injection member comprises:
first and second flaps spaced apart from each other while facing each other in a width direction of the anti-error-injection member, the first and second flaps configured to move in a direction away from each other when the fuel gun having the predetermined diameter or more is inserted;
a third flap positioned in a lower space between the first flap and the second flap and configured to be locked to the first flap and the second flap, the third flap configured to be unlocked when the fuel gun having the predetermined diameter or more is inserted, so as to be movable outward of an outer peripheral surface of the fuel gun; and
a spring formed at one end of each of the first flap, the second flap, and the third flap, the spring being elastically supported by the second retainer.

15. The capless filler neck structure of claim 14, wherein the third flap has a third latching protrusion formed to be locked to the second flapper, and the second flapper has a flapper latching groove formed to have a shape corresponding to the third latching protrusion.

16. The capless filler neck structure of claim 14, wherein:
the first flap has a first latching protrusion formed to be locked to a first end of the third flap;
the second flap has a second latching protrusion formed to be locked to a second end of the third flap; and
the third flap has a first latching groove formed at the first end thereof to have a shape corresponding to the first latching protrusion, and a second latching groove formed at the second end thereof to have a shape corresponding to the second latching protrusion.

17. The capless filler neck structure of claim 16, wherein, when the fuel gun having the predetermined diameter or more is inserted, a distance between the first flap and the second flap increases and the first and second latching protrusions are configured to be unlatched from the first and second latching grooves, so that the third flap is movable downward.

\* \* \* \* \*

UNITED STATES PATENT AND TRADEMARK OFFICE
CERTIFICATE OF CORRECTION

| | | |
|---|---|---|
| PATENT NO. | : 11,745,582 B2 | Page 1 of 1 |
| APPLICATION NO. | : 17/020119 | |
| DATED | : September 5, 2023 | |
| INVENTOR(S) | : Lee et al. | |

It is certified that error appears in the above-identified patent and that said Letters Patent is hereby corrected as shown below:

On the Title Page

Item (72), in Column 1, in "Inventors", Line 5, delete "Chui" and insert -- Chul --.

Signed and Sealed this
Twelfth Day of December, 2023

Katherine Kelly Vidal
*Director of the United States Patent and Trademark Office*